(12) United States Patent
Hyodo et al.

(10) Patent No.: US 10,252,125 B2
(45) Date of Patent: Apr. 9, 2019

(54) GOLF CLUB SHAFT

(71) Applicants: SUMITOMO RUBBER INDUSTRIES, LTD., Kobe-shi, Hyogo (JP); GIFU UNIVERSITY, Gifu-shi, Gifu (JP)

(72) Inventors: Takehiko Hyodo, Kobe (JP); Yumi Kanemitsu, Kobe (JP); Asami Nakai, Gifu (JP); Akio Ohtani, Gifu (JP); Tadashi Uozumi, Gifu (JP)

(73) Assignees: SUMITOMO RUBBER INDUSTRIES, LTD., Kobe-Shi, Hyogo (JP); GIFU UNIVERSITY, Gifu-Shi, Gifu (JP)

( * ) Notice: Subject to any disclaimer, the term of this patent is extended or adjusted under 35 U.S.C. 154(b) by 0 days.

(21) Appl. No.: 15/558,136

(22) PCT Filed: Apr. 27, 2016

(86) PCT No.: PCT/JP2016/063221
§ 371 (c)(1),
(2) Date: Sep. 13, 2017

(87) PCT Pub. No.: WO2016/185889
PCT Pub. Date: Nov. 24, 2016

(65) Prior Publication Data
US 2018/0078834 A1  Mar. 22, 2018

(30) Foreign Application Priority Data

May 18, 2015 (JP) ................................. 2015-100803

(51) Int. Cl.
*A63B 53/10* (2015.01)
*A63B 60/08* (2015.01)
(Continued)

(52) U.S. Cl.
CPC .............. *A63B 53/10* (2013.01); *A63B 60/08* (2015.10); *B29C 70/32* (2013.01); *B29C 70/56* (2013.01);
(Continued)

(58) Field of Classification Search
CPC ..... A63B 53/10; A63B 60/08; A63B 2209/02; B29L 2031/5227; B29C 70/32; B29C 70/56
See application file for complete search history.

(56) References Cited

U.S. PATENT DOCUMENTS 2,573,361 A * 10/1951 Rodgers, Jr. ........... A63B 53/10
  156/171
3,998,458 A * 12/1976 Inoue ..................... A63B 53/10
  273/DIG. 23
(Continued)

FOREIGN PATENT DOCUMENTS

JP  2-88088 A   3/1990
JP  9-267402 A  10/1997
(Continued)

OTHER PUBLICATIONS

International Search Report, issued in PCT/JP2016/063221, dated Aug. 2, 2016.

*Primary Examiner* — Stephen Blau
(74) *Attorney, Agent, or Firm* — Birch, Stewart, Kolasch & Birch, LLP

(57) ABSTRACT

To provide a lightweight shaft having excellent strength, a shaft has one or a plurality of fiber reinforced resin layers. At least one of the fiber reinforced resin layers is produced by a filament winding method in which one or a plurality of fiber bundles are wound while tension is applied thereto. The fiber bundles each include a plurality of filaments. The tension applied to the fiber bundles is not less than 0.04 (gf) per filament. The tension is great. Preferably, at least one of
(Continued)

the fiber reinforced resin layers is produced by a multi-filament winding method in which a plurality of the fiber bundles are simultaneously wound while being arranged side by side. Preferably, fibers forming the filaments are carbon fibers. Preferably, a resin composition included in each fiber reinforced resin layer is an epoxy resin composition.

10 Claims, 7 Drawing Sheets

(51) Int. Cl.
 *B29C 70/32* (2006.01)
 *B29C 70/56* (2006.01)
 *B29L 31/52* (2006.01)
(52) U.S. Cl.
 CPC ... *A63B 2209/02* (2013.01); *B29L 2031/5227* (2013.01)

(56) References Cited

U.S. PATENT DOCUMENTS

| | | | | |
|---|---|---|---|---|
| 4,089,727 A | * | 5/1978 | McLain | B29C 53/665 156/169 |
| 4,125,423 A | * | 11/1978 | Goldsworthy | B29C 31/002 156/175 |
| 5,156,396 A | * | 10/1992 | Akatsuka | A63B 53/10 473/319 |
| 5,188,872 A | * | 2/1993 | Quigley | B29C 53/8058 114/102.31 |
| 5,437,450 A | * | 8/1995 | Akatsuka | A63B 53/10 273/DIG. 23 |
| RE35,081 E | * | 11/1995 | Quigley | B29C 70/08 114/102.31 |
| 5,653,646 A | * | 8/1997 | Negishi | A63B 53/10 273/DIG. 23 |
| 6,171,696 B1 | * | 1/2001 | Takemura | D01F 9/145 264/29.2 |
| 6,581,644 B1 | * | 6/2003 | Monette | F16L 9/12 138/125 |
| 9,840,058 B2 | * | 12/2017 | Tsunashima | A63B 49/10 |
| 2016/0271465 A1 | * | 9/2016 | Mordasini | A63B 53/10 |

FOREIGN PATENT DOCUMENTS

| | | |
|---|---|---|
| JP | 10-119138 A | 5/1998 |
| JP | 2009-95601 A | 5/2009 |
| JP | 2010-234529 A | 10/2010 |

* cited by examiner

GOLF CLUB SHAFT

TECHNICAL FIELD

The present invention relates to golf club shafts.

BACKGROUND ART

A golf club shaft is generally produced by a sheet winding method. As another method, a filament winding method in which one fiber bundle is wound is known. JPH10-119138 discloses a pressure vessel produced by the filament winding method.

CITATION LIST

Patent Literature

Patent Literature 1: JPH10-119138

SUMMARY OF THE INVENTION

Problems to be Solved by the Invention

In the case of the sheet winding method, a seam essentially occurs. In addition, a winding start end portion and a winding finish end portion are present. The seam and these end portions can be starting points of cracks. Furthermore, wrinkles and waviness of fibers can occur due to a winding defect of a sheet, etc. The wrinkles and the waviness can decrease the strength of the shaft.

In the filament winding method, the above drawback in the sheet winding method can be eliminated. In light of weight reduction, further enhancement of the strength is desired.

The present inventors have conducted thorough research for the filament winding method. As a result, the present inventors have obtained new finding that allows enhancement of the strength of a molded article.

An object of the present invention is to provide a golf club shaft produced by a filament winding method and having excellent strength.

Solution to the Problems

A preferred golf club shaft according to the present invention has one or a plurality of fiber reinforced resin layers. At least one of the fiber reinforced resin layers is produced by a filament winding method in which one or a plurality of fiber bundles are wound while tension is applied thereto. The fiber bundles each include a plurality of filaments. The tension applied to the fiber bundles is not less than 0.04 (gf) per filament.

Preferably, at least one of the fiber reinforced resin layers is produced by a multi-filament winding method in which a plurality of the fiber bundles are simultaneously wound while being arranged side by side.

Preferably, the shaft has a plurality of the fiber reinforced resin layers produced by the multi-filament winding method. Preferably, each of the fiber reinforced resin layers is formed by helically winding the plurality of fiber bundles while arranging the fiber bundles side by side such that a gap is not substantially present.

Preferably, fibers forming the fiber bundles are carbon fibers.

Preferably, a resin composition included in each fiber reinforced resin layer is an epoxy resin composition.

The fiber bundles may include a first fiber bundle including a first fiber and a second fiber bundle including a second fiber. Preferably, the first fiber has a tensile elastic modulus different from that of the second fiber.

Advantageous Effects of the Invention

A lightweight shaft having high strength can be obtained.

DESCRIPTION OF EMBODIMENTS

The following will describe in detail the present invention based on preferred embodiments with appropriate reference to the drawings.

In the present application, the term "inner side" means the inner side in the radial direction of a shaft. In the present application, the term "outer side" means the outer side in the radial direction of the shaft. In the present application, the term "axial direction" means the axial direction of the shaft.

Figure 1:
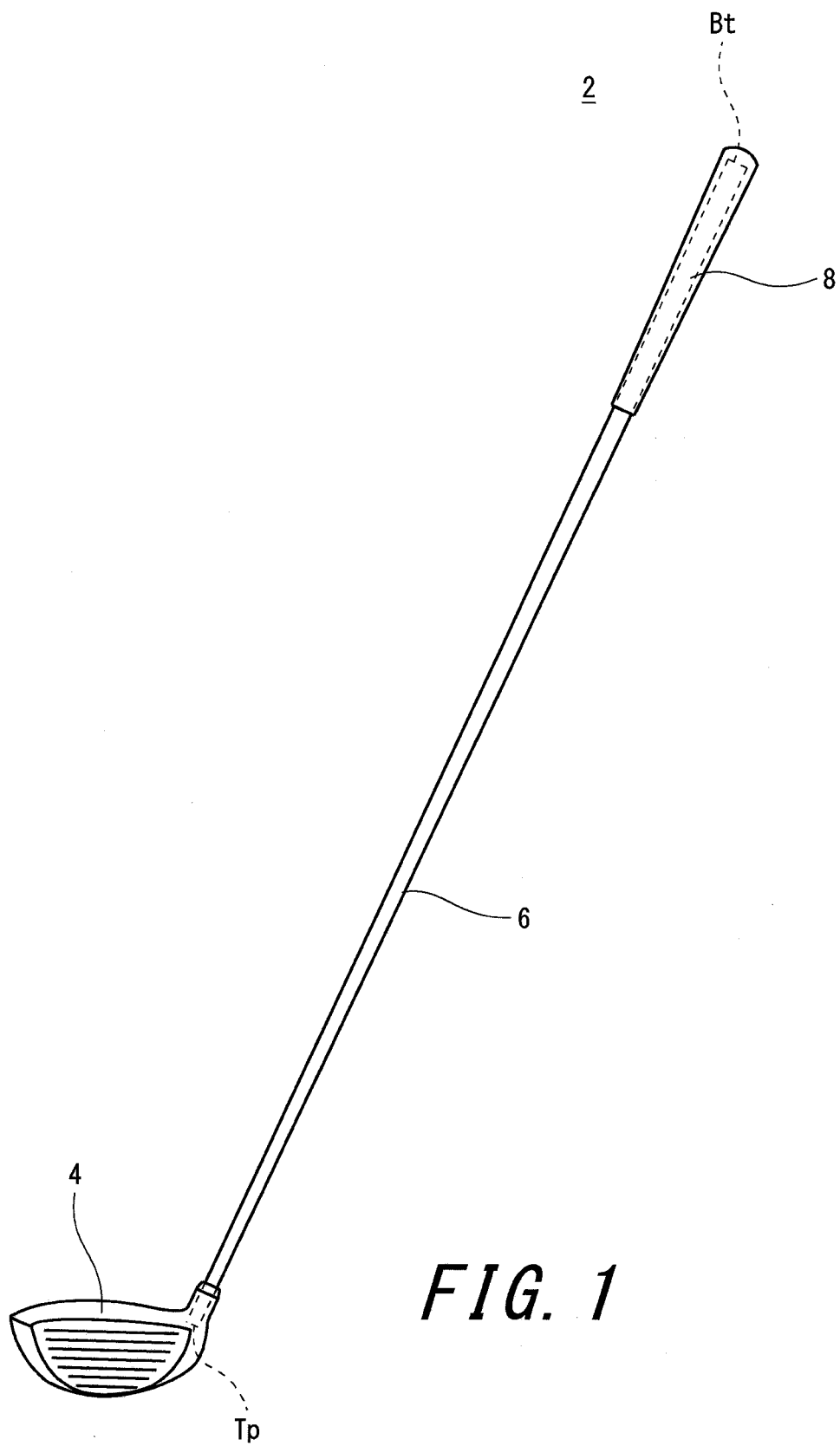
FIG. 1 shows a golf club including a shaft according to an embodiment of the present invention.

FIG. 1 shows a golf club 2 including a golf club shaft 6 according to an embodiment of the present invention. The golf club 2 includes a head 4, a shaft 6, and a grip 8. The head 4 is provided at a tip end portion of the shaft 6. The grip 8 is provided at a butt end portion of the shaft 6. Examples of the head 4 include a wood type golf club head, a hybrid type golf club head, a utility type golf club head, an iron type golf club head, and a putter head. The head 4 shown in FIG. 1 is a wood type golf club head.

Examples of the material of the head 4 include titanium, a titanium alloy, CFRP (carbon fiber reinforced plastics), stainless steel, maraging steel, and soft iron. A plurality of materials may be combined. For example, CFRP and a titanium alloy can be combined.

The shaft 6 is a laminated body including a plurality of fiber reinforced resin layers. The shaft 6 is a tubular body. The shaft 6 has a hollow structure. As shown in FIG. 1, the shaft 6 has a tip end Tp and a butt end Bt. The tip end Tp is located within the head 4. The butt end Bt is located within the grip 8.

The shaft 6 is produced by a filament winding method. The shaft 6 may be produced by a combination of the filament winding method and another production method. For example, the filament winding method and a sheet winding method may be combined.

As types of the filament winding method, a dry method and a wet method are known.

In the wet method, while a fiber bundle is impregnated with a resin composition, the fiber bundle is wound on a mandrel. In the wet method, a resin tank for impregnation with the resin composition is needed. In the wet method, variations in the amount of resin contained easily occur.

Meanwhile, in the dry method, a towpreg is used. The towpreg is a fiber bundle that is impregnated with a resin composition in advance. The towpreg is also referred to as tow prepreg, yarn prepreg, or strand prepreg. A commercially available towpreg can be used.

In the dry method, a resin tank is not needed, and thus the work efficiency increases. From this viewpoint, the dry method is preferable. In addition, in the dry method, variations in the amount of resin contained are less likely to occur as compared to those in the wet method. Also from this viewpoint, the dry method is preferable. That is, it is preferable to use a towpreg.

Normally, the towpreg is mounted to a filament winding apparatus in a state where the towpreg is wound on a bobbin. In a multi-filament winding method, for example, a plurality of bobbins are set to the filament winding apparatus. A plurality of towpregs are simultaneously fed from the respective bobbins.

The multi-filament winding method is a filament winding method in which a plurality of fiber bundles are simultaneously wound. Meanwhile, a single-filament winding method is a filament winding method in which a single fiber bundle is wound.

The fiber bundle normally has a thousand to tens of thousands of filaments. The fiber bundle is also referred to as fiber yarn. Examples of the fiber bundle include trade name "TORAYCA yarn" manufactured by Toray Industries, Inc. "TORAYCA" is a registered trademark. A preferable fiber bundle is a bundle of about 1000 to 70000 filaments. Typically, examples of the number of the filaments of the fiber bundle include 1000 (1K), 3000 (3K), 6000 (6K), 12000 (12K), 18000 (18K), and 24000 (24K).

The above resin-impregnated reinforced fibers include long fibers. The above filaments mean long fibers. Examples of the fibers include carbon fibers, glass fibers, aramid fibers, boron fibers, alumina fibers, and silicon carbide fibers. Two or more types of these fibers may be used in combination. In light of strength of the shaft, preferable fibers are carbon fibers.

Examples of the carbon fibers include PAN-based carbon fibers, pitch-based carbon fibers, and rayon-based carbon fibers. In light of tensile strength, PAN-based carbon fibers are preferable. Examples of the form of the carbon fibers include carbon fibers obtained by twisting precursor fibers and firing the twisted fibers (so-called twisted yarns), carbon fibers obtained by untwisting the twisted yarns (so-called untwisted yarns), and twistless yarns obtained by performing a heat treatment on precursor fibers without substantially twisting the precursor fibers. In light of handleability of the fiber bundle, twistless yarns are preferable. In addition, the carbon fibers may include graphite fibers.

In light of strength and rigidity of a molded article, the tensile elastic modulus of the fibers is preferably not less than 10 t/mm$^2$ and more preferably not less than 23.5 t/mm$^2$, and is preferably not greater than 70 t/mm$^2$ and more preferably not greater than 50 t/mm$^2$. The tensile elastic modulus is measured according to JIS R 7601: 1986 "Testing methods for carbon fiber".

In light of balance between weight reduction and strength, the content of reinforcing fibers in the shaft is preferably not less than 65% by weight and more preferably not less than 70% by weight, and is preferably not greater than 85% by weight and more preferably not greater than 80% by weight.

As described above, the fiber bundle is impregnated with the resin composition. As the resin composition, an epoxy resin composition is preferable. The base resin of the epoxy resin composition is an epoxy resin. The epoxy resin component contained in the epoxy resin composition is preferably an epoxy resin having two epoxy groups within the molecule. In other words, the epoxy resin component preferably contains a bifunctional epoxy resin. Specific examples of the bifunctional epoxy resin include bisphenol type epoxy resins such as bisphenol A type epoxy resins, hydrogenated products thereof, bisphenol F type epoxy resins, hydrogenated products thereof, bisphenol S type epoxy resins, tetrabromobisphenol A type epoxy resins, and bisphenol AD type epoxy resins. Bisphenol type epoxy resins may be used solely, or two or more bisphenol type epoxy resins may be mixed and used.

The epoxy resin composition preferably contains a curing agent. A typical curing agent is dicyandiamide. A curing auxiliary for enhancing curing activity can be combined with the curing agent. As the curing auxiliary, a urea derivative in which at least one hydrogen atom bonded to urea is substituted with a hydrocarbon group is preferable. The epoxy resin composition may further contain an oligomer, a polymer compound, organic particles, inorganic particles, etc.

A wrapping tape is wound on the mandrel having the filaments wound thereon, and the mandrel is heated. Because of this heating, the resin composition becomes cured. Thereafter, the mandrel is pulled out, and the wrapping tape is removed. According to need, the surface is polished. Finally, a shaft is obtained as a molded article.

Figure 2:
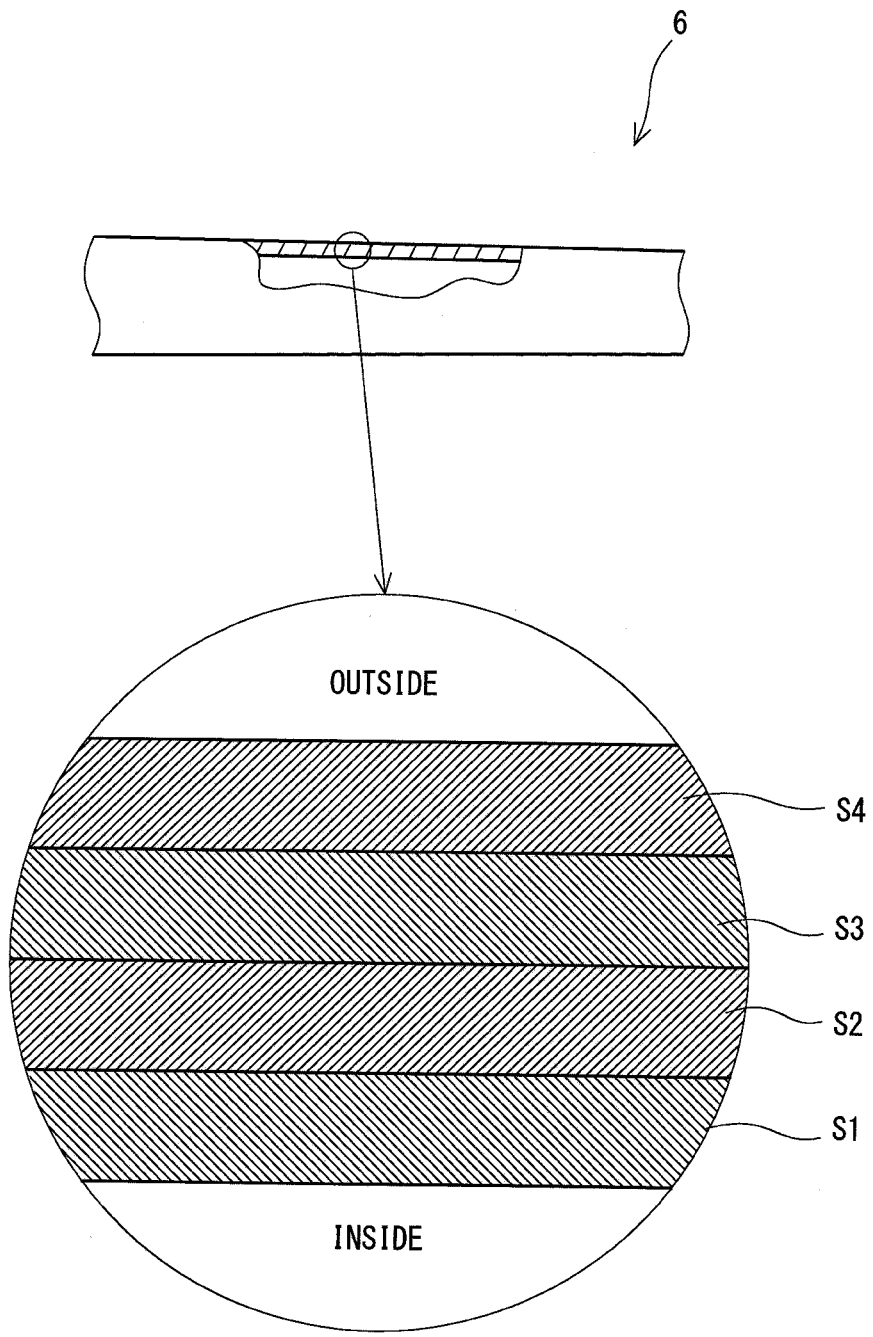
FIG. 2 is a partial cross-sectional view of the shaft according to the embodiment in FIG. 1.

FIG. 2 is a partially cutaway diagram of the shaft 6. In a circle in FIG. 2, an enlarged shaft cross-section is shown. The shaft 6 has a plurality of layers. In the embodiment in FIG. 2, the shaft 6 has four layers. The shaft 6 has a layer S1, a layer S2, a layer S3, and a layer S4. The layer S1, the layer S2, the layer S3, and the layer S4 are laminated in this order from the inner side in the radial direction. The layer S1 is the innermost layer. The layer S4 is the outermost layer.

Examples of layers forming a shaft include a straight layer, a bias layer, and a hoop layer. Preferably, the shaft 6 has a straight layer and/or a bias layer. The shaft 6 may further have a hoop layer.

The straight layer is a layer in which the direction of fibers is set substantially at 0° relative to the shaft axial direction. Normally, in the straight layer, a fiber absolute angle is not greater than 10°. The fiber absolute angle being not greater than 10° means that the orientation angle of the fibers relative to the axial direction is not less than −10° and not greater than 10°.

The bias layer is a layer in which the direction of fibers is tilted relative to the shaft axial direction. Preferably, the bias layer has two layers in which fibers are tilted in directions opposite to each other. In light of torsional rigidity, the fiber absolute angle of the bias layer is preferably not less than 15°, more preferably not less than 25°, and further preferably not less than 40°. In light of torsional rigidity and bending rigidity, the fiber absolute angle of the bias layer is preferably not greater than 75°, more preferably not greater than 65°, and more preferably not greater than 50°.

The hoop layer is a layer in which the direction of fibers is set substantially at 90° relative to the shaft axial direction. Preferably, the fiber absolute angle of the hoop layer is not less than 80° and not greater than 90°.

Figure 3:
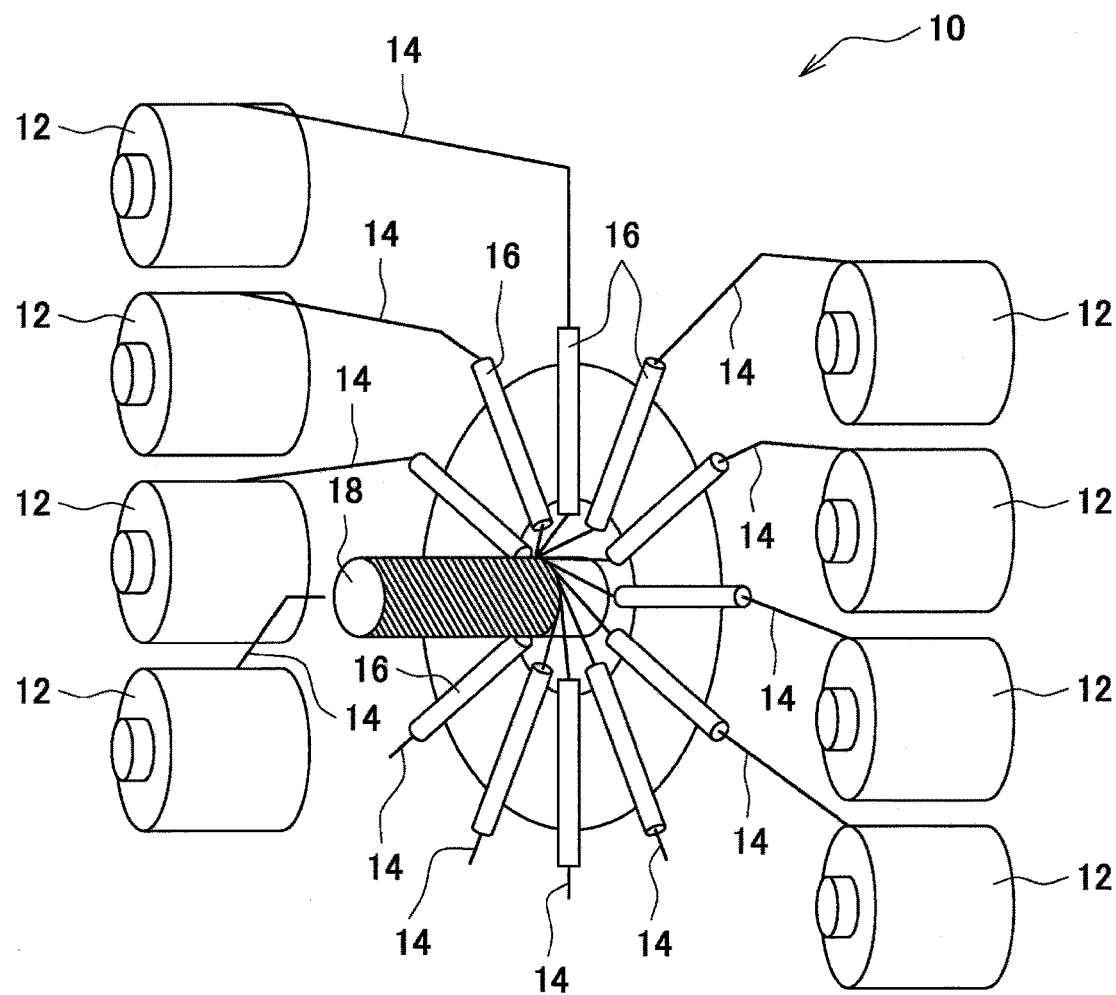
FIG. 3 is a perspective view schematically showing a production apparatus used for production of the shaft in FIG. 1.

FIG. 3 is a schematic diagram showing a production apparatus 10 for the shaft 6. The production apparatus 10 is a filament winding apparatus. The production apparatus 10 includes a plurality of bobbins 12, a bobbin carrier (not shown) for holding these bobbins 12, and yarn guides 16 each of which guides a yarn 14 withdrawn from the bobbin 12, to a winding position. The yarn guides 16 are pipes. Although not shown, the production apparatus 10 further includes a mandrel drive portion that drives a mandrel 18. In the present embodiment, the yarns 14 are towpregs.

The production apparatus 10 is a multi-filament winding apparatus capable of simultaneously winding a plurality of yarns 14. The production apparatus 10 is capable of simultaneously winding the plurality of yarns 14 while arranging the yarns 14 side by side. The plurality of yarns 14 are simultaneously wound at the same position in the axial direction. The plurality of yarns 14 are wound from different positions in the circumferential direction, respectively. The plurality of yarns 14 are simultaneously wound from a plurality of positions in the circumferential direction.

The production apparatus 10 is capable of helically winding a plurality of fiber bundles (the yarns 14) while arranging the fiber bundles side by side such that a gap is not substantially present therebetween. All the yarns 14 shown in FIG. 3 are helically wound while being arranged side by side such that a gap is not substantially present therebetween.

Although not shown, the production apparatus 10 includes a tension adjusting mechanism that can adjust tension acting on the yarns 14. The tension adjusting mechanism can adjust tension to a desired value while keeping the tension constant. The tension adjusting mechanism can apply greater tension to the yearns 14 than in a normal filament winding method.

The mandrel drive portion can move the mandrel 18 in the axial direction while rotating the mandrel 18 about its axis. Owing to the movement of the mandrel 18, the plurality of yarns 14 are wound on the mandrel.

An apparatus like the production apparatus 10 is publicly known. An example of such an apparatus is the filament winding apparatus disclosed in JP2010-234529. What is shown in FIG. 3 corresponds to one braider unit in the filament winding apparatus disclosed in JP2010-234529.

JPH10-119138 described above discloses a filament winding method in which a single fiber bundle is wound. In this case, waviness easily occurs due to intersection of the fiber bundle. As shown in FIG. 3(a) of JPH10-119138, the wound fiber bundle intersects itself. At the intersection part, a later-wound fiber bundle portion overlaps on an earlier-wound fiber bundle portion. The later-wound fiber bundle portion climbs over the earlier-wound fiber bundle portion. The earlier-wound fiber bundle portion forms a step, and the later-wound fiber bundle portion climbs over the step. Thus, the position of the later-wound fiber bundle portion varies in the radial direction, and the fiber bundle is bent. This bend is the waviness. The waviness can disrupt the orientation of the fibers and decrease strength and rigidity. In addition, a gap occurs between the fibers at the intersection part. At the gap, a resin-gathering area is produced. This resin-gathering area increases the weight of a molded article. The weight of the resin-gathering area does not contribute to the shaft strength.

In the present embodiment, the above waviness due to intersection of a fiber bundle (towpreg) is prevented. That is, the fiber bundle is wound such that the waviness does not occur. Specifically, at each of the layers S1, S2, S3, and S4, a plurality of fiber bundles are helically wound while being arranged side by side such that a gap is not substantially present therebetween. The phrase "a gap is not substantially present" means that a gap has a size not greater than 0.2 mm, and the gap has a size more preferably not greater than 0.1 mm and further preferably not greater than 0.05 mm.

With the production apparatus 10, a plurality of (N) fiber bundles are simultaneously wound while being arranged side by side with respect to each other. N is a natural number that is not less than 2. In order to achieve winding in which no overlapping occurs and a gap is not substantially present, a width W of each fiber bundle, the above number N, and a fiber angle $\theta$ are taken into consideration. The fiber angle $\theta$ is the angle of the shaft (mandrel) relative to the axial direction. A helical pitch P depends on the fiber angle $\theta$. Preferably, the number N of the fiber bundles is determined such that the total width of the simultaneously wound fiber bundles is substantially equal to the pitch P.

When the width of a single fiber bundle is denoted by W, the number of a plurality of fiber bundles to be simultaneously wound while being arranged side by side with respect to each other is denoted by N, and a helical pitch is denoted by P, the fiber angle $\theta$ is preferably determined so as to satisfy the following equation (1). In this case, winding in which no overlapping occurs and a gap is not substantially present can be achieved. The width W is preferably regarded as a width after winding, not as a width before winding.

$$P = W \times N \quad (1)$$

As shown in FIG. 2, the shaft 6 of the present embodiment has a plurality of (four) layers. At the first layer S1, a plurality of towpregs are wound while being arranged side by side such that a gap is not substantially present therebetween. The layer S1 is formed by helically winding the plurality of fiber bundles while arranging the fiber bundles side by side such that a gap is not substantially present therebetween. The thickness of the layer S1 is equal to the thickness of each towpreg. By the towpregs being arranged side by side such that the towpregs do not overlap each other and a gap is not present therebetween, the single layer S1 is formed. The same applies to the second layer S2, the third layer S3, and the fourth layer S4. Therefore, intersection where a towpreg climbs over another towpreg does not occur. In the shaft 6, waviness of the fibers and a resin-gathering area are suppressed. The shaft 6 is lightweight and has excellent strength.

The shaft 6 is produced by a filament winding method in which fiber bundles are wound while tension is applied thereto. As described above, the fiber bundles each include a plurality of filaments.

The present inventors have obtained new finding that the strength of a molded article obtained finally is enhanced by increasing the above tension. Conventionally, there has been no technical idea that tension can correlate to strength. In a conventional filament winding method, minimum required tension is merely applied.

The reason for which great tension enhances the strength is not clear. Inferable reasons for this are the following (a) and (b). However, these reasons are considered to fail to sufficiently explain a strength enhancing effect shown in Examples described later.

(a) The orientation of the fibers (filaments) is enhanced by high tension.

(b) The orientation of the molecules forming the filaments is enhanced by high tension.

Furthermore, the present inventors have obtained new finding that the damping ratio of a molded article obtained finally is increased by increasing the above tension. Conventionally, there has been no technical idea that tension can correlate to vibration characteristics.

The reason for which great tension increases the damping ratio is not clear. Even when the above-described (a) and (b) are taken into consideration, these reasons are considered not to be the reason for which the damping ratio is increased. As shown by data in Examples described later, the damping ratio significantly improves by tension.

For a golf club shaft, importance is put on feeling upon ball hitting. Vibration damping performance highly correlates to this feeling. By high vibration damping performance, feeling upon ball hitting becomes good.

The tension is converted to tension per filament. For example, when tension of 1000 gf is applied to a 24K towpreg, tension per filament is:

1000/24000=0.0417 (gf).

In light of enhancing strength, the tension per filament is preferably not less than 0.04 (gf), more preferably not less than 0.13 (gf), and still more preferably not less than 0.30 (gf). Also in light of enhancing vibration damping performance, this numerical range is preferable. In light of prevention of breakage of the fibers, the tension per filament is preferably not greater than 1.5 (gf) and more preferably not greater than 1.0 (gf).

As described above, the shaft 6 is produced by a multi-filament winding method in which a plurality of fiber bundles are simultaneously wound while being arranged side by side. Thus, waviness of the fibers is suppressed, and the strength of the shaft can be enhanced. In addition, the degree of freedom of the fiber angle θ can be increased by adjusting the number of fiber bundles to be arranged side by side.

In the shaft 6, at each fiber reinforced resin layer, a plurality of fiber bundles are helically wound while being arranged side by side such that a gap is not substantially present therebetween. Each fiber reinforced resin layer is formed by helically winding the plurality of fiber bundles while arranging the fiber bundles side by side such that a gap is not substantially present therebetween. Thus, even with a plurality of layers, waviness of the fibers is suppressed.

The invention of the production method according to the present application is a production method that is a filament winding method in which a plurality of fiber bundles are helically wound while being arranged side by side such that a gap is not substantially present therebetween. Preferably, in this production method, the plurality of fiber bundles are wound while tension of 0.04 (gf) or greater per filament is applied.

As described above, by increasing tension to be applied during winding, the strength of a molded article obtained finally is enhanced. In addition, by increasing the tension to be applied during winding, the damping ratio of the molded article obtained finally is increased. It is preferable if the tension is great, and a wound state is not limited. Thus, for example, a plurality of fiber bundles may be interwoven with each other. The shaft according to the present application may have an interwoven layer formed by fiber bundles being interwoven with each other. A publicly known braider apparatus enables a multi-filament winding method in which fiber bundles are wound while being interwoven with each other. In the multi-filament method according to the present invention, fiber bundles may be wound while being interwoven with each other. The interwoven layer is also referred to as braided layer, and each fiber bundle forming the interwoven layer is also referred to as braid.

For example, the interwoven layer has a first fiber bundle having an angle of +θ° relative to the axial direction, a second fiber bundle having an angle of −θ° relative to the axial direction, and a third fiber bundle having an angle of 0° relative to the axial direction. At the interwoven layer, waviness occurs in the fiber bundles, since the fiber bundles are interwoven with each other. Due to the waviness, a gap occurs between the fiber bundles. Furthermore, when a plurality of interwoven layers are laminated, a gap also occurs between the interwoven layers due to the above waviness. From these viewpoints, preferably, the fiber bundles are not interwoven with each other. From the standpoint that occurrence of waviness and a gap is suppressed and the strength is enhanced, a plurality of fiber bundles are preferably wound while being arranged side by side as in the above embodiment. From this viewpoint, a preferable production method is a multi-filament winding method in which a plurality of fiber bundles are simultaneously wound while being arranged side by side.

In the above filament winding, two or more types of fibers may be mixed. By mixing and winding two or more types of fibers, a different-type-mixed layer in which the two or more types of fibers are mixed is formed. The physical properties of the different-type-mixed layer have total values of the physical properties of the multiple fibers. By changing the physical properties of each fiber, the physical properties of the different-type-mixed layer can be adjusted. In addition, by changing a mixing ratio of the multiple fibers, the physical properties of the different-type-mixed layer can be adjusted. Therefore, the physical properties of a layer obtained finally can be set with a high degree of freedom.

In light of increasing the degree of freedom of physical properties, the fiber bundle preferably includes a first fiber bundle including first fibers and a second fiber bundle including second fibers. In light of increasing the degree of freedom of physical properties, the tensile elastic modulus of the first fibers is preferably different from the tensile elastic modulus of the second fibers.

When the first fibers and the second fibers are mixed, obtained physical properties are the averages of the physical properties of these fibers. The averages are each a weighted average for which a mixing ratio (weight ratio) is taken into consideration. Three or more types of fibers may be mixed.

For example, the tensile elastic modulus of the first fibers is denoted by E1, and the tensile elastic modulus of the second fibers is denoted by E2. When the first fibers and the second fibers are mixed in a weight ratio of 1:1, the tensile elastic modulus of the fibers in the entirety of an obtained layer is (E1+E2)/2.

Multi-filament winding is a production method in which a plurality of fiber bundles are simultaneously wound while being arranged side by side. Thus, it is easy to form a different-type-mixed layer. That is, a different-type-mixed layer can be easily produced by simultaneously winding a plurality of different types of fiber bundles while arranging the fiber bundles side by side. For example, a production method in which a first fiber bundle and a second fiber bundle are simultaneously wound while being arranged side by side, is enabled.

In the above-described production apparatus 10 (FIG. 3), the plurality of bobbins 12 are used. Thus, a different-type-mixed layer can be easily produced by changing the type of the yarn 14 per bobbin 12.

In light of uniform mixing, it is possible to alternately arrange a plurality of different types of fiber bundles side by side. For example, first fiber bundles (first yarns 14) and second fiber bundles (second yarns 14) can be simultaneously wound while being alternately arranged side by side. In this case, in the production apparatus 10, the bobbins 12 having the first fiber bundles (first yarns 14) wound thereon and the bobbins 12 having the second fiber bundles (second yarns 14) wound thereon may be alternately arranged.

A specific example of the different-type-mixed layer is as follows. For example, a towpreg including carbon fibers having a tensile elastic modulus of 24 tf/mm$^2$ is used as the first fiber bundle, and a towpreg including carbon fibers having a tensile elastic modulus of 40 tf/mm$^2$ is used as the second fiber bundle. When the first fiber bundle and the second fiber bundle are mixed in a weight ratio of 1:1, a layer equivalent to a layer obtained when carbon fibers having a tensile elastic modulus of 32 tf/mm$^2$ are used is obtained.

As commercially available prepregs, a prepreg having a fiber elastic modulus of 24 tf/mm$^2$ (e.g., "TR350C-100S", manufactured by MITSUBISHI RAYON CO., LTD.), a prepreg having a fiber elastic modulus of 30 tf/mm$^2$ (e.g., "MRX350C-100S", manufactured by MITSUBISHI RAYON CO., LTD.), and a prepreg having a fiber elastic modulus of 40 tf/mm$^2$ (e.g., "HRX350C-100S", manufactured by MITSUBISHI RAYON CO., LTD.) are known. However, a prepreg having a fiber elastic modulus of 32 tf/mm$^2$ is not commercially available. By mixing a plurality of different types of fiber bundles, a layer having a fiber elastic modulus corresponding to a commercially unavailable fiber elastic modulus can be formed. In addition, a layer having no seam and no gap can be formed by a filament winding method. The layer having no seam and no gap has excellent strength as compared to that obtained by a sheet winding production method in which prepregs cut into a strip shape are wound. Furthermore, the strength is further enhanced by applying high tension during winding.

Another specific example of the different-type-mixed layer is as follows. A towpreg including carbon fibers having a tensile elastic modulus of 24 tf/mm$^2$ is used as the first fiber bundle, and a towpreg including carbon fibers having a tensile elastic modulus of 35 tf/mm$^2$ is used as the second fiber bundle. When the first fiber bundle and the second fiber bundle are mixed in a weight ratio of 1:1, a layer equivalent to a layer obtained when carbon fibers having a tensile elastic modulus of 29.5 tf/mm$^2$ are used is obtained.

Still another specific example of the different-type-mixed layer is as follows. A towpreg including carbon fibers having a tensile elastic modulus of 30 tf/mm$^2$ is used as the first fiber bundle, and a towpreg including carbon fibers having a tensile elastic modulus of 35 tf/mm$^2$ is used as the second fiber bundle. When the first fiber bundle and the second fiber bundle are mixed in a weight ratio of 1:1, a layer equivalent to a layer obtained when carbon fibers having a tensile elastic modulus of 32.5 tf/mm$^2$ are used is obtained.

Still another specific example of the different-type-mixed layer is as follows. A towpreg including carbon fibers having a tensile elastic modulus of 35 tf/mm$^2$ is used as the first fiber bundle, and a towpreg including carbon fibers having a tensile elastic modulus of 40 tf/mm$^2$ is used as the second fiber bundle. When the first fiber bundle and the second fiber bundle are mixed in a weight ratio of 1:1, a layer equivalent to a layer obtained when carbon fibers having a tensile elastic modulus of 37.5 tf/mm$^2$ are used is obtained.

As described above, by mixing different types of fiber bundles, the degree of freedom of the physical properties is increased. Examples of carbon fibers having a tensile elastic modulus of 24 tf/mm$^2$ include trade name "PYROFIL TR 30S" manufactured by MITSUBISHI RAYON CO., LTD. Examples of carbon fibers having a tensile elastic modulus of 30 tf/mm$^2$ include trade name "PYROFIL MR 60H 24P" manufactured by MITSUBISHI RAYON CO., LTD. Examples of carbon fibers having a tensile elastic modulus of 35 tf/mm$^2$ include trade name "PYROFIL MS 40 12M" manufactured by MITSUBISHI RAYON CO., LTD. Examples of carbon fibers having a tensile elastic modulus of 40 tf/mm$^2$ include trade name "PYROFIL HR 40 12M" manufactured by MITSUBISHI RAYON CO., LTD.

EXAMPLES

The following will show effects of the present invention by means of examples, but the present invention should not be construed in a limited manner based on the description of these examples.

Evaluation Methods

In order to evaluate the strength of a shaft, three-point bending strength and torsional strength were measured by the following methods. In addition, in order to evaluate vibration damping performance, a damping ratio was measured by the following method.

Three-Point Bending Strength

Figure 4:
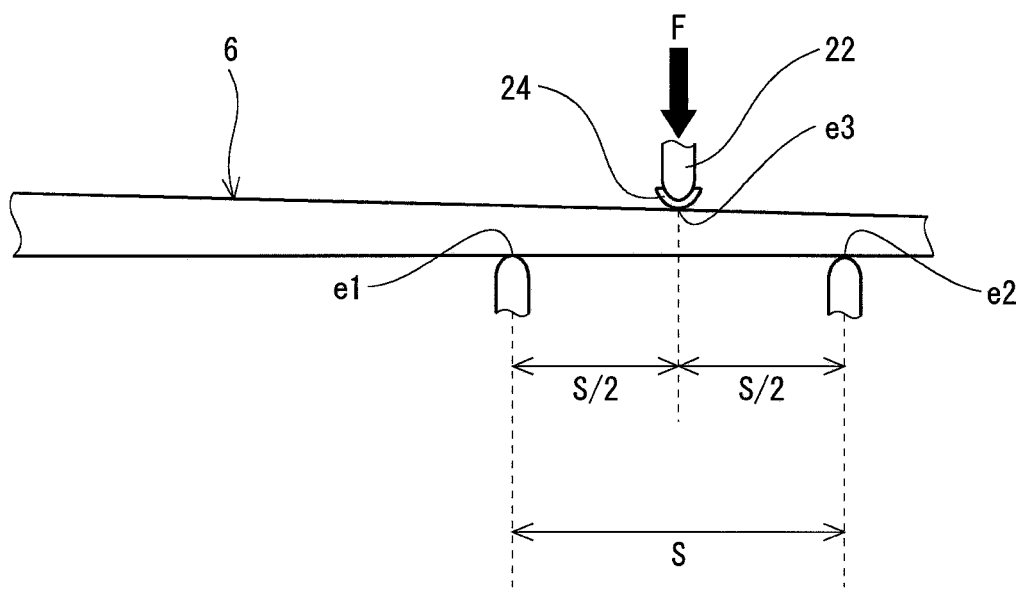
FIG. 4 is a diagram illustrating a three-point bending strength test.

Three-point bending strength was measured according to an SG type three-point bending strength test. The SG type is a test method specified by the Consumer Product Safety Association in Japan. As a measuring instrument, a Shimadzu autograph manufactured by Shimadzu Corporation was used. FIG. 4 shows the method for measuring three-point bending strength. As shown in FIG. 4, a load F was applied to the shaft 6 at a load point e3 from the upper side toward the lower side while the shaft 6 was supported at two support points e1 and e2 from the lower side. The load F was applied by an indenter 22. A silicone rubber 24 was attached to a tip end of the indenter 22. The load point e3 was located at a position at which the space between the support point e1 and the support point e2 was divided into two equal parts. The load point e3 is a measuring point. The moving speed of the load point e3 was set to 20 mm/min. The central position of the shaft 6 in the longitudinal direction thereof was set as the measuring point. A span S was set as 300 mm. The value (peak value) of the load F when the shaft 6 was broken was measured. The results are shown in Tables 1 and 2 below.

Torsional Strength

Figure 5:
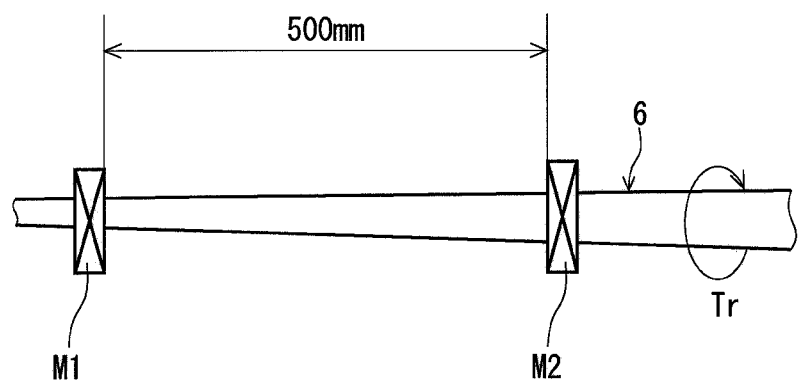
FIG. 5 is a diagram illustrating a torsional strength test.

FIG. 5 schematically shows the method for measuring torsional strength. A portion from the shaft tip end Tp to 50 mm was fixed by a first jig M1 so as to be non-rotatable, and the shaft 6 was held by a second jig M2 at a position away from the first jig M1 by 500 mm. The second jig M2 was rotated at 2.0 rpm to apply torque Tr to the shaft 6. The value of the torque Tr when breakage started was measured. The results are shown in Table 2 below.

Damping Ratio (Half-Value Width Method)

Figure 6:
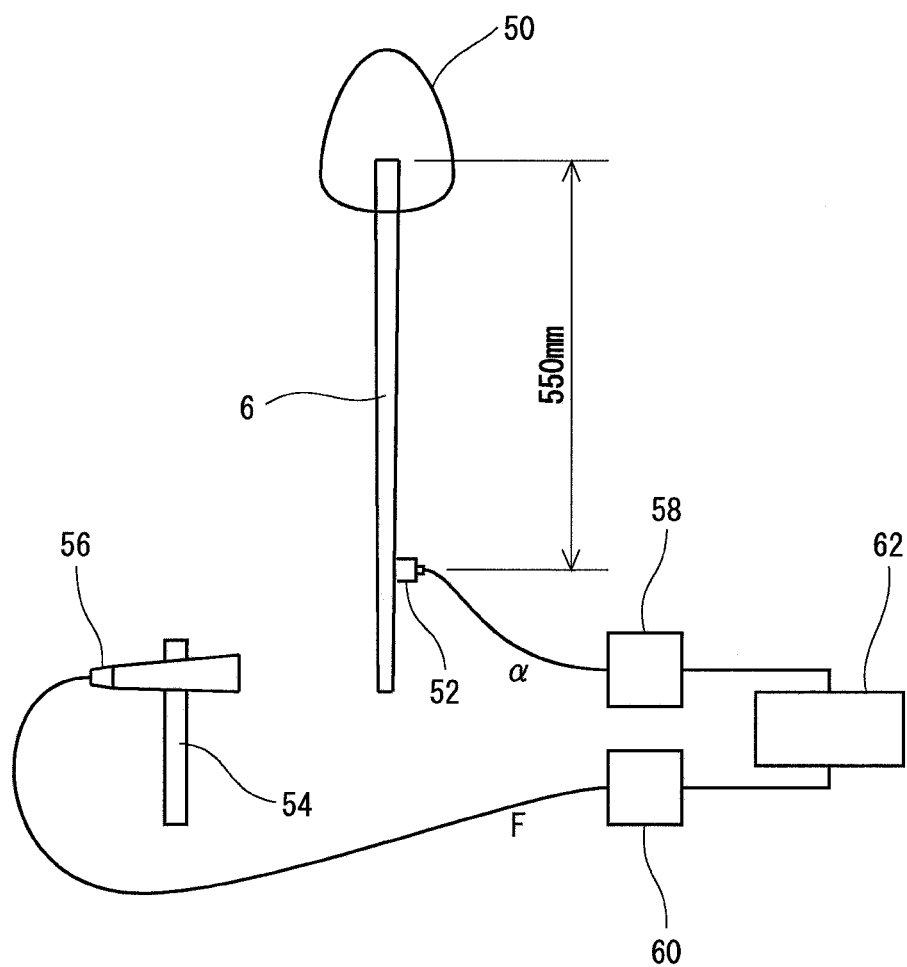
FIG. 6 is a diagram illustrating a method for measuring a damping ratio.

FIG. 6 shows the method for measuring a damping ratio. In this measurement, a string 50 was attached to a butt side end portion of the shaft 6. In addition, an acceleration pick-up meter 52 was attached at a point away from the butt end by 550 mm (from the tip end by 10 mm). The shaft 6 was hung down by using the string 50. In this hung-down state, vibration was applied by hitting the vicinity of the center of the shaft 6 in the longitudinal direction thereof with an impact hammer 54. The position at which the hit was made was adjusted such that peaks (particularly, primary and secondary peaks) of a transfer function were increased. Input vibration F was measured by a force pick-up meter 56 attached to the impact hammer 54. In addition, response vibration α was measured by the acceleration pick-up meter 52. The response vibration α was inputted to a frequency analyzer 62 through an amplifier 58. The input vibration F was inputted to the frequency analyzer 62 through an amplifier 60.

MODEL 352C22 manufactured by PCB Piezotronics, Inc. was used as the acceleration pick-up meter 52. MODEL 086C04 manufactured by PCB Piezotronics, Inc. was used as the impact hammer 54. MODEL 482A18 manufactured by PCB Piezotronics, Inc. was used as the amplifier 58. Dynamic single analyzer HP3562A manufactured by the Hewlett-Packard Company was used as the frequency analyzer 62.

Figure 7:
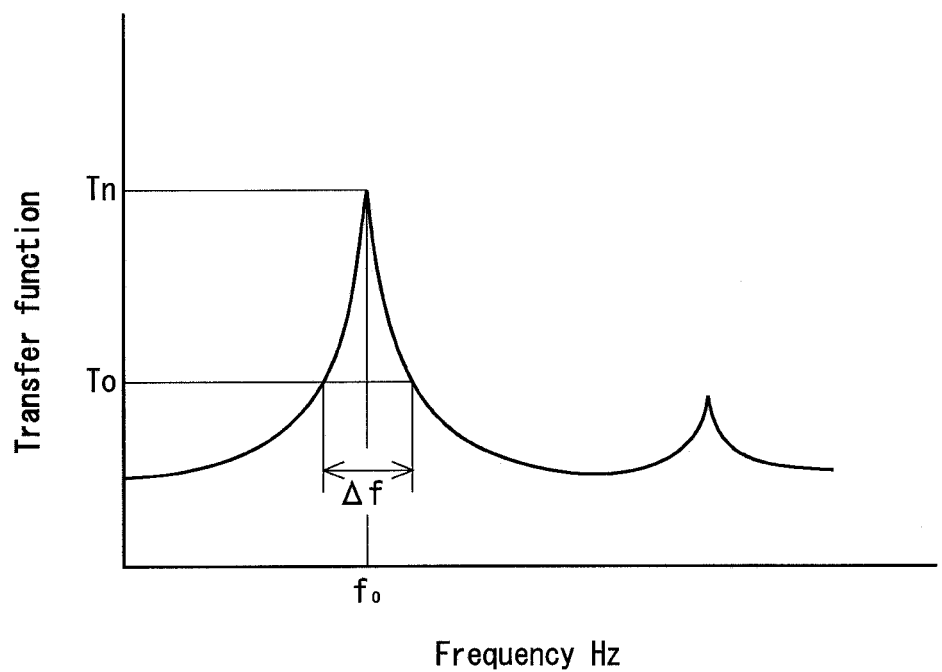
FIG. 7 is an example of a graph of a transfer function regarding measurement of the damping ratio.

A transfer function in a frequency region obtained through analysis was obtained, and a peak frequency $f_0$ of the shaft 6 was obtained. FIG. 7 is a graph showing an example of the transfer function. A damping ratio (ζ) primary vibration was obtained by the following equation using the primary waveform of the graph.

$$\zeta = (1/2) \times (\Delta f / f_0)$$

$$To = Tn \times 2^{1/2}$$

Tn is a peak value (maximum value) of the transfer function, To is a value obtained by multiplying Tn by √2, and Δf is the frequency width when the transfer function is To (see FIG. 7). For the secondary waveform, the same calculation was performed, and a damping ratio of secondary vibration was calculated. These values are shown in Table 3 below.

Test 1 (Four-Layer Structure)

Example 1 and Comparative Example 1 were created as described below, and a strength comparison was made therebetween.

Example 1

A shaft that is the same as the above-described shaft 6 was produced. A production method and a production apparatus therefor are as described above. As the production apparatus, a "48-carrier braider" manufactured by Murata Machinery, Ltd. was used. As each towpreg, "T800SC24K-SX3-RC30" manufactured by JXTG Nippon Oil & Energy Corporation was used. The towpreg was a 24K towpreg. That is, the fiber bundle of the towpreg included 24000 filaments.

The lamination was made with 4 layers. All the layers were formed by a filament winding method. The following lamination configuration was provided. All the layers were bias layers.

First layer S1: the fiber angle θ was +45°.
Second layer S2: the fiber angle θ was −45°.
Third layer S3: the fiber angle θ was +45°.
Fourth layer S4: the fiber angle θ was −45°.

Eight bobbins on each of which the above towpreg was wound were prepared. These eight bobbins were mounted to the above "48-carrier braider". The eight towpregs were simultaneously wound on a mandrel while being arranged side by side. Tension applied to each towpreg was 1000 gf. Thus, tension per filament was 0.042 gf.

The layer S1 was formed through one-way movement of the mandrel for the first time. In this formation, the eight towpregs (fiber bundles) were helically wound while being arranged side by side such that a gap was not substantially present therebetween. In the same manner, the layer S2, the layer S3, and the layer S4 were formed. The above four layers were sequentially formed by the mandrel reciprocating in the axial direction twice. Thereafter, a wrapping tape was wound, and heating was performed in an oven at 130° C. for 2 hours thereby to cure a resin composition. The mandrel and the wrapping tape were removed to obtain a shaft of Example 1. The length of the shaft was 400 mm, and the weight of the shaft was 25.5 g.

Comparative Example 1

A shaft of Comparative Example 1 was obtained in the same manner as Example 1, except that the tension was changed from 1000 gf to 500 gf. As a matter of course, the length and the weight of the shaft were equal to those of Example 1.

The evaluation results of Example 1 and Comparative Example 1 were as shown in Table 1 below. The three-point bending strength of Example 1 was higher than that of Comparative Example 1 by 12%.

TABLE 1

Specifications and Evaluation Results of Example and Comparative Example (Test 1)

| | Example 1 | Comparative Example 1 |
|---|---|---|
| Tension per filament (gf) | 0.042 | 0.021 |
| Three-point bending strength | Enhanced by 12% as compared to Comparative Example 1 | — |

Test 2 (Seven-Layer Structure)

Examples 2 to 4 and Comparative Example 2 were created as described below, and a strength comparison was made therebetween.

Example 2

Example 2 was made to have a seven layer structure. All the layers were formed by a filament winding method. The following lamination configuration was provided.

First layer (innermost layer): the fiber angle θ was +45°.
Second layer: the fiber angle θ was −45°.
Third layer: the fiber angle θ was 0°.
Fourth layer: the fiber angle θ was +88°.
Fifth layer: the fiber angle θ was 0°.
Sixth layer: the fiber angle θ was −88°.
Seventh layer (outermost layer): the fiber angle θ was 0°.

The towpregs used for the respective layers were as described below. "T800SC12K-SX3-RC30" (manufactured by JXTG Nippon Oil & Energy Corporation) was a 12K towpreg, and the resin content thereof was 30% by weight. "T800SC6K-SX3-RC30" (manufactured by JXTG Nippon Oil & Energy Corporation) was a 6K towpreg, and the resin content thereof was 30% by weight.

First layer (innermost layer): T800SC6K-SX3-RC30
Second layer: T800SC6K-SX3-RC30
Third layer: T800SC6K-SX3-RC30
Fourth layer: T800SC6K-SX3-RC30
Fifth layer: T800SC6K-SX3-RC30

Sixth layer: T800SC6K-SX3-RC30
Seventh layer (outermost layer): T800SC12K-SX3-RC30

As a production apparatus, a "48-multifilament winder" manufactured by Murata Machinery, Ltd. was used.

Fifteen bobbins on each of which the above towpreg was wound were prepared. In addition, a tapered mandrel was prepared. These fifteen bobbins were mounted to the above "48-multifilament winder". In forming the first layer (+45°) and the second layer (−45°), the fifteen towpregs were simultaneously wound on the mandrel while being arranged side by side. Tension applied to each towpreg in this winding was 0.04 gf per filament. Also in forming the third to seventh layers, tension of 0.04 gf was applied per filament. A wrapping tape was wound on the outer side of the seventh layer (outermost layer), and heating was performed in an oven at 130° C. for 2 hours thereby to cure a resin composition. The mandrel and the wrapping tape were removed to obtain a shaft of Example 2. The length of the shaft was 600 mm, and the weight of the shaft was 26.3 g.

Example 3

A shaft of Example 3 was obtained in the same manner as Example 2, except that the tension per filament was changed from 0.04 gf to 0.13 gf. The length and the weight of the shaft of Example 3 were equal to those of Example 2.

Example 4

A shaft of Example 4 was obtained in the same manner as Example 2, except that the tension per filament was changed from 0.04 gf to 0.30 gf. The length and the weight of the shaft of Example 4 were equal to those of Example 2.

Comparative Example 2

A shaft of Comparative Example 2 was obtained in the same manner as Example 2, except that the tension per filament was changed from 0.04 gf to 0.02 gf. The length and the weight of the shaft of Comparative Example 2 were equal to those of Example 2.

For each of Examples 2 to 4 and Comparative Example 2, three-point bending strength and torsional strength were measured. The results are shown in Table 2 below.

TABLE 2

Specifications and Evaluation Results of Examples and Comparative Example (Test 2)

| | Comparative Example 2 | Example 2 | Example 3 | Example 4 |
|---|---|---|---|---|
| Tension per filament (gf) | 0.02 | 0.04 | 0.13 | 0.30 |
| Three-point bending strength | — | Enhanced by 12% as compared to Comparative Example 2 | Enhanced by 16% as compared to Comparative Example 2 | Enhanced by 21% as compared to Comparative Example 2 |
| Torsional strength | — | Enhanced by 10% as compared to Comparative Example 2 | Enhanced by 20% as compared to Comparative Example 2 | Enhanced by 25% as compared to Comparative Example 2 |

The three-point bending strength of Example 2 was enhanced by 12% as compared to that of Comparative Example 2. The torsional strength of Example 2 was enhanced by 10% as compared to that of Comparative Example 2.

The three-point bending strength of Example 3 was enhanced by 16% as compared to that of Comparative Example 2. The torsional strength of Example 3 was enhanced by 20% as compared to that of Comparative Example 2.

The three-point bending strength of Example 4 was enhanced by 21% as compared to that of Comparative Example 2. The torsional strength of Example 4 was enhanced by 25% as compared to that of Comparative Example 2.

Test 3 (Seven-Layer Structure)

Examples 5 and 6 and Comparative Example 3 were created as described below, and vibration damping performance was compared therebetween.

Example 5

Example 5 was made to have a seven layer structure. All the layers were formed by a filament winding method. The following lamination configuration was provided.
First layer (innermost layer): the fiber angle θ was +45°.
Second layer: the fiber angle θ was −45°.
Third layer: the fiber angle θ was 0°.
Fourth layer: the fiber angle θ was +88°.
Fifth layer: the fiber angle θ was 0°.
Sixth layer: the fiber angle θ was −88°.
Seventh layer (outermost layer): the fiber θ was 0°.

For all the layers, "T800SC6K-SX3-RC30" (manufactured by JXTG Nippon Oil & Energy Corporation) was used. This was a 6K towpreg, and the resin content thereof was 30% by weight.

As a production apparatus, a "48-multifilament winder" manufactured by Murata Machinery, Ltd. was used.

A tapered mandrel was prepared. In forming the first layer (+45°) and the second layer (−45°), eleven bobbins were mounted to the above "48-multifilament winder", and towpregs were wound from these bobbins. In forming the third layer (0°), eighteen bobbins were mounted to the above "48-multifilament winder", and towpregs were wound from these bobbins. In forming the fourth layer (+88°), one bobbin was mounted to the above "48-multifilament winder", and a towpreg was wound from this bobbin. In forming the fifth layer (0°), eighteen bobbins were mounted to the above "48-multifilament winder", and towpregs were wound from these bobbins. In forming the six layer (−88°), one bobbin was mounted to the above "48-multifilament winder", and a towpreg was wound from this bobbin. In forming the seventh layer (0°), eighteen bobbins were mounted to the above "48-multifilament winder", and towpregs were wound from these bobbins.

In forming the first layer (+45°) and the second layer (−45°), eleven towpregs were simultaneously wound while being arranged side by side. In forming the third layer (0°), the fifth layer (0°), and the seventh layer (0°), eighteen towpregs were simultaneously wound while being arranged side by side. In winding for each of the layers, tension applied to each towpreg was 0.13 gf per filament.

A wrapping tape was wound on the outer side of the seventh layer (outermost layer), and heating was performed in an oven at 130° C. for 2 hours thereby to cure a resin composition. The mandrel and the wrapping tape were removed to obtain a shaft of Example 5. The length of the shaft was 600 mm, and the weight of the shaft was 26.3 g.

Example 6

A shaft of Example 6 was obtained in the same manner as Example 5, except that the tension per filament was changed from 0.13 gf to 0.30 gf. The length and the weight of the shaft of Example 6 were equal to those of Example 5.

Comparative Example 3

A shaft of Comparative Example 3 was obtained in the same manner as Example 5, except that the tension per filament was changed from 0.13 gf to 0.02 gf. The length and the weight of the shaft of Comparative Example 3 were equal to those of Example 5.

For each of Examples 5 and 6 and Comparative Example 3, the damping ratios of primary vibration and secondary vibration were measured. The results are shown in Table 3 below.

TABLE 3

Specifications and Evaluation Results of Examples and Comparative Example (Test 3)

| | | Comparative Example 3 | Example 5 | Example 6 |
|---|---|---|---|---|
| | Tension per filament (gf) | 0.02 | 0.13 | 0.30 |
| Primary vibration | Peak frequency $f_0$ | 214 | 243 | 240 |
| | Frequency width $\Delta f$ | 0.802 | 2.398 | 4.720 |
| | Damping ratio $\zeta$ | 0.002 | 0.005 | 0.010 |
| Secondary vibration | Peak frequency $f_0$ | 644 | 674 | 666 |
| | Frequency width $\Delta f$ | 1.877 | 3.347 | 5.913 |
| | Damping ratio $\zeta$ | 0.001 | 0.002 | 0.004 |

The damping ratio of primary vibration in Example 5 was 2.5 times that in Comparative Example 3. The damping ratio of primary vibration in Example 6 was 5 times that in Comparative Example 3.

The damping ratio of secondary vibration in Example 5 was 2 times that in Comparative Example 3. The damping ratio of secondary vibration in Example 6 was 4 times that in Comparative Example 3.

These results show that the strength and the vibration damping performance of the shaft are enhanced by high tension. Advantages of the present invention are clear.

INDUSTRIAL APPLICABILITY

The shaft described above is applicable to all golf clubs.

DESCRIPTION OF THE REFERENCE CHARACTERS

2 . . . golf club
4 . . . head
6 . . . shaft
8 . . . grip
10 . . . production apparatus
12 . . . bobbin
14 . . . yarn
16 . . . yarn guide
18 . . . mandrel
22 . . . indenter
24 . . . silicone rubber
Tp . . . tip end of shaft
Bt . . . butt end of shaft

The invention claimed is:

1. A golf club shaft comprising a plurality of fiber reinforced resin layers, wherein
the plurality of fiber reinforced resin layers are produced by a multi-filament winding method in which a plurality of fiber bundles are simultaneously wound side by side on the same layer while tension is applied thereto,
the fiber bundles each include a plurality of filaments, and
the tension applied to the fiber bundles is equal to or greater than 0.13 (gf) and equal to or less than 0.30 (gf) per filament.

2. The golf club shaft according to claim 1 wherein each of the fiber reinforced resin layers is formed by helically winding the plurality of fiber bundles while arranging the fiber bundles side by side such that a gap is not substantially present.

3. The golf club shaft according to claim 1, wherein fibers forming the filaments are carbon fibers.

4. The golf club shaft according to claim 1, wherein a resin composition included in each fiber reinforced resin layer is an epoxy resin composition.

5. The golf club shaft according to claim 1, wherein
the fiber bundles include a first fiber bundle including a first fiber and a second fiber bundle including a second fiber comprising a different material than the first fiber, and
the first fiber has a tensile elastic modulus different from that of the second fiber.

6. A production method for a golf club shaft having a plurality of fiber reinforced resin layers, the method comprising:
winding a plurality of fiber bundles simultaneously while constant tension is applied thereto to form the fiber reinforced resin layers,
wherein the plurality of fiber bundles are arranged side by side on the same layer,
wherein the fiber bundles each include a plurality of filaments, and
wherein the tension applied to the fiber bundles is equal to or greater than 0.13 (gf) and equal to or less than 0.30 (gf) per filament.

7. The production method for the golf club shaft according to claim 6, wherein
each of the fiber reinforced resin layers is formed by helically winding the plurality of fiber bundles while arranging the fiber bundles side by side such that a gap is not substantially present.

8. The production method for the golf club shaft according to claim 6, wherein fibers forming the filaments are carbon fibers.

9. The production method for the golf club shaft according to claim 6, wherein a resin composition included in each fiber reinforced resin layer is an epoxy resin composition.

10. The production method for the golf club shaft according to claim 6, wherein
the fiber bundles include a first fiber bundle including a first fiber and a second fiber bundle including a second fiber comprising a different material than the first fiber, and the first fiber has a tensile elastic modulus different from that of the second fiber.

* * * * *